(12) United States Patent
Kim et al.

(10) Patent No.: US 8,081,163 B2
(45) Date of Patent: Dec. 20, 2011

(54) RAISED KEYS ON A MINIATURE KEYBOARD

(75) Inventors: Anthony Kim, Tracy, CA (US); Seun Kim, Barrington, IL (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 841 days.

(21) Appl. No.: 12/129,674

(22) Filed: May 29, 2008

(65) Prior Publication Data

US 2009/0027235 A1    Jan. 29, 2009

Related U.S. Application Data

(63) Continuation of application No. 11/151,848, filed on Jun. 13, 2005, now Pat. No. 7,394,456, which is a continuation of application No. 09/940,325, filed on Aug. 27, 2001, now Pat. No. 6,940,490.

(51) Int. Cl.
*G09G 5/00* (2006.01)

(52) U.S. Cl. ............ 345/168; 345/169; 341/21; 341/23; 341/27

(58) Field of Classification Search .......... 345/168–169; 341/21, 23, 27

See application file for complete search history.

(56) References Cited

U.S. PATENT DOCUMENTS

| | | | | | |
|---|---|---|---|---|---|
| 5,212,473 | A | * | 5/1993 | Louis | 345/168 |
| 5,274,217 | A | * | 12/1993 | Kilian | 235/145 R |
| 5,660,448 | A | * | 8/1997 | Kiesewetter et al. | 303/155 |
| 5,831,819 | A | * | 11/1998 | Chacon et al. | 361/679.56 |
| 6,748,116 | B1 | * | 6/2004 | Yue | 382/238 |
| 2002/0110238 | A1 | * | 8/2002 | Kiernan | 379/433.07 |

* cited by examiner

*Primary Examiner* — Richard Hjerpe
*Assistant Examiner* — Leonid Shapiro

(57) ABSTRACT

A miniature keyboard wherein the keys are arranged in a way to improve data entry and decrease the chance of depressing multiple keys at a time. Accordingly, the height of the keys are patterned to decrease the chance of multiple key depressions thus increasing the accuracy of data input into the personal digital assistant. In one embodiment, the height of the keys is alternated down the individual rows of keys. In another embodiment, the height of the keys is alternated across individual columns of keys. Similarly, in another embodiment, the heights of the keys are arranged in a checkered pattern on the keyboard. In addition, another embodiment staggers the heights of the keys and incorporates embodiments mentioned above. By incorporating different key arrangements and alternating the height of the keys, key differentiation, key navigation, and data input accuracy is greatly improved due to the improved tactile feedback provided by the miniature keyboard.

7 Claims, 16 Drawing Sheets

1400

100

1100

1300

1500

RAISED KEYS ON A MINIATURE KEYBOARD

RELATED APPLICATIONS

This application is a continuation of U.S. patent application Ser. No. 11/151,848 filed Jun. 13, 2005, now U.S. Pat. No. 7,394,456 entitled "RAISED KEYS ON A MINIATURE KEYBOARD" which is a continuation of U.S. patent application Ser. No. 09/940,325 filed Aug. 27, 2001, now issued as U.S. Pat. No. 6,940,490; all of the aforementioned priority application being hereby incorporated by reference.

FIELD OF THE INVENTION

The present invention generally relates to the field of data input devices. More particularly, the present invention relates to the field of keypad data input devices.

RELATED ART

A personal digital assistant (commonly referred to as a PDA) is a portable computer system. It is appreciated that the personal digital assistant is a portable handheld device that is used as an electronic organizer which has the capability to store a wide range of information that includes daily appointments, numerous telephone numbers of business and personal acquaintances, and various other information. Furthermore, the personal digital assistant has the ability to connect to a personal computer system, enabling the two devices to exchange updated information. Additionally, the personal digital assistant can be connected to modem, enabling it to have electronic mail (e-mail) capabilities over the Internet along with other Internet capabilities over a wireless communication interface. Also, the personal digital assistant can be coupled to a networking environment.

Typically, the personal digital assistant includes a data input device such as a handwriting recognition device that can be utilized to control and operate the personal digital assistant. The handwriting recognition device receives user input handwriting stroke data, whereas a user utilizes a stylus to stroke alphanumeric characters and analog characters (e.g., *, &, @, $, etc.) on the handwriting recognition device. The handwriting recognition device processes the user input handwriting stroke data and transmits the processed data to another component (e.g., an electronic display device, a memory unit, a processor, etc.) of the personal digital assistant so that a particular operation or function can be performed. Personal digital assistants are enormously popular, in part because of their handwriting recognition device.

However, everyone does not use the handwriting device. Some potential users simply do not understand how the handwriting recognition device operates. Other potential users have experimented with the handwriting recognition device, but have been frustrated by not being able to get the handwriting recognition device to work right away, leaving them with the impression that the handwriting recognition device does not work for them. Moreover, some potential users believe that their own handwriting is too hard for a human to read, much less a handwriting recognition device. Other potential users feel that handwriting recognition is too error prone.

A software keyboard has been incorporated into the personal digital assistant. The software or virtual keyboard is displayed on the touch sensitive electronic display device of the personal digital assistant when invoked by the user. Refer to prior art FIG. 1 for an example of a software keyboard on a personal digital assistant. The user utilizes a stylus to select a particular keyboard character. Unfortunately, when the software keyboard 131 is displayed, the user experiences a marked reduction in the amount of space, on the touch sensitive electronic display device 130, available to display data.

The company SOFTAVA has developed the product Slikyboard as a solution for the perceived problems with the handwriting recognition device. The Silkeyboard includes a keyboard template that is positioned over the handwriting recognition device. Thus, a user can tap on the appropriate location on the keyboard template to select and input a particular keyboard character. Moreover, the user can stroke characters on the keyboard template, causing the handwriting recognition device to detect and to recognize the stroked characters as particular alphanumeric characters or particular analog characters. Refer to prior art FIG. 2 for an example of a keyboard template 140 positioned on the touch sensitive display device 131. However, the Silkyboard has several disadvantages. First, the user finds it cumbersome, distracting, error-prone, difficult, and unintuitive to stroke characters over the keyboard template. Secondly, the user becomes dependent on the keyboard template rather than learning and employing the productivity enhancements of the handwriting recognition device, preventing the user from fully experiencing the power of the handwriting recognition device.

In addition, the company FTLab has developed the product Thumb Type as a solution for the perceived problems with the handwriting recognition device. Now referring to FIG. 3, the Thumb Type includes a special sheet having keyboard keys molded from high precision plastic and arranged with an approximate 6-millimeter (mm) pitch on the special sheet. This special sheet is positioned over the handwriting recognition device. The Thumb Type is designed so that the user holds the personal digital assistant in both hands and types using both thumbs. If the user desires to employ the handwriting recognition features of the handwriting recognition device, the Thumb Type enables the user to display the handwriting recognition feature on the touch sensitive electronic display device of the personal digital assistant. Thus, the user can stroke characters on the touch sensitive electronic display device rather than on the handwriting device, causing the handwriting recognition device to detect and to recognize via the touch sensitive electronic display device. Besides the disadvantages discussed in connection with the Silkyboard, the Thumb Type also has the disadvantage that the handwriting recognition feature displayed on the touch sensitive electronic display device further reduces the productivity space available for the user on the touch sensitive electronic display device and interferes with normal viewing of the data displayed on the touch sensitive electronic display device. Refer to prior art FIG. 3 and FIG. 4 for examples of thumb activated keyboards 120 coupled to a personal digital assistant 100.

Despite the advancements of thumb activated typing devices for personal digital assistants, there still exist many problems using keyboards with portable electronic devices. One prevalent concern of personal digital assistant users that utilize thumb activated input devices is accuracy. Many of the thumb activated input devices are very small and the keys of the device are very close together to keep the device as compact as possible. The result of the compact design is a tendency for users to unintentionally select the wrong key or multiple keys when using the device because these small keypads do not offer much tactile feedback as to key navigation. In addition, multiple keys are pressed because of the relatively small size of the keys with respect to the size of the fingers and thumbs. This leads to inaccuracy and ultimately loss of efficiency. Often the user presses multiple keys at once.

Thus, there exists a need for a miniature keyboard that allows the user to accurately and confidently input the desired characters while maintaining a small and compact design that is desired by users and useful for portable applications.

SUMMARY OF THE PRESEST INVENTION

In accordance with embodiments of the present invention, a miniature keyboard is disclosed to facilitate improved key differentiation and data input. Embodiments of the present invention provide a device for data entry with a portable electronic device such as a personal digital assistant, a pager, a cell phone, etc. In addition, the present invention does not require special instructions or a ramp-up period as do existing data entry devices for a personal digital assistant.

Embodiments of the present invention include a miniature keyboard wherein the keys are arranged in a way to improve navigation, data entry and decrease the chance of depressing multiple keys at a time. The keys are arranged in a way to keep the keyboard consistent with the compact features of a personal digital assistant. Accordingly, the height of the keys are patterned to decrease the chance of multiple key depressions thus increasing the accuracy of data input into the personal digital assistant.

More specifically, in one embodiment, the height of the keys is alternated down the individual rows of keys (e.g. some rows are raised to improve tactile feedback to the user). In another embodiment, the height of the keys is alternated across individual columns of keys. Similarly, in another embodiment, the height of the keys is patterned in a checkered pattern on the keyboard. In addition, another embodiment staggers the keys and incorporates embodiments mentioned above. By incorporating different key arrangements and alternating the height of the keys, key differentiation and data input accuracy is greatly improved. Key differentiation is improved because better tactile feedback is provided when depressing keys. A point of reference is provided thereby avoiding pressing multiple keys or improper keys.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

Figure 5:
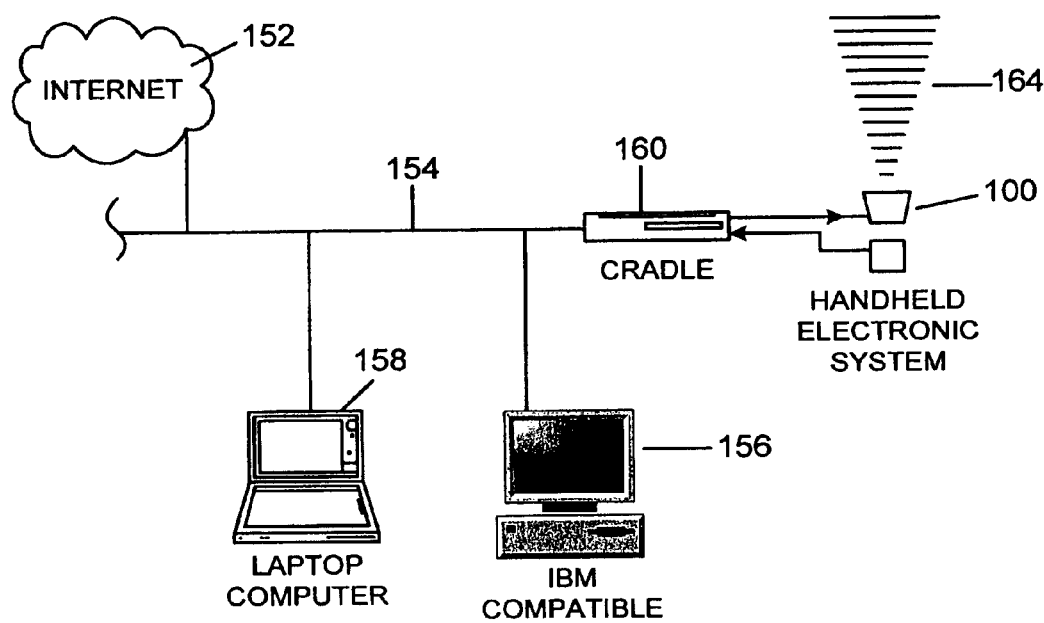
FIG. 5 illustrates a network environment, including a handheld electronic system coupled to a host computer system and the Internet Via a cradle device, in which embodiments of the present invention can be practiced.
Figure 6:
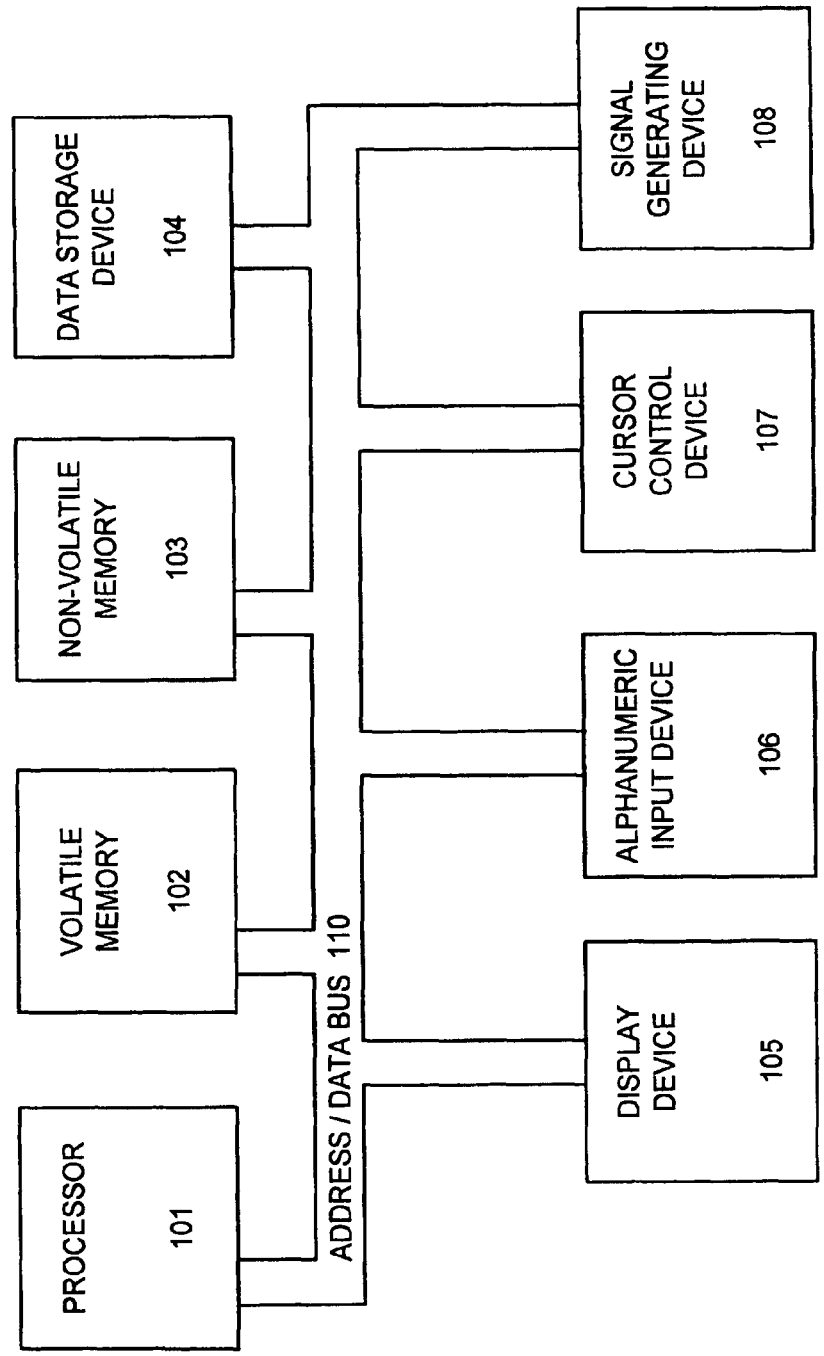
FIG. 6 illustrates a logical circuit block diagram of a handheld electronic system in which embodiments of the present invention can be practiced.

Although the present invention may be implemented in a variety of different electronic systems such as a pager, a mobile phone, a calculator, a personal digital assistant (PDA), etc., one exemplary embodiment includes the keyboard with a portable computing system. It should be understood that the descriptions corresponding to FIGS. 5-6 provide general information about an exemplary portable computing system.

Figure 1:
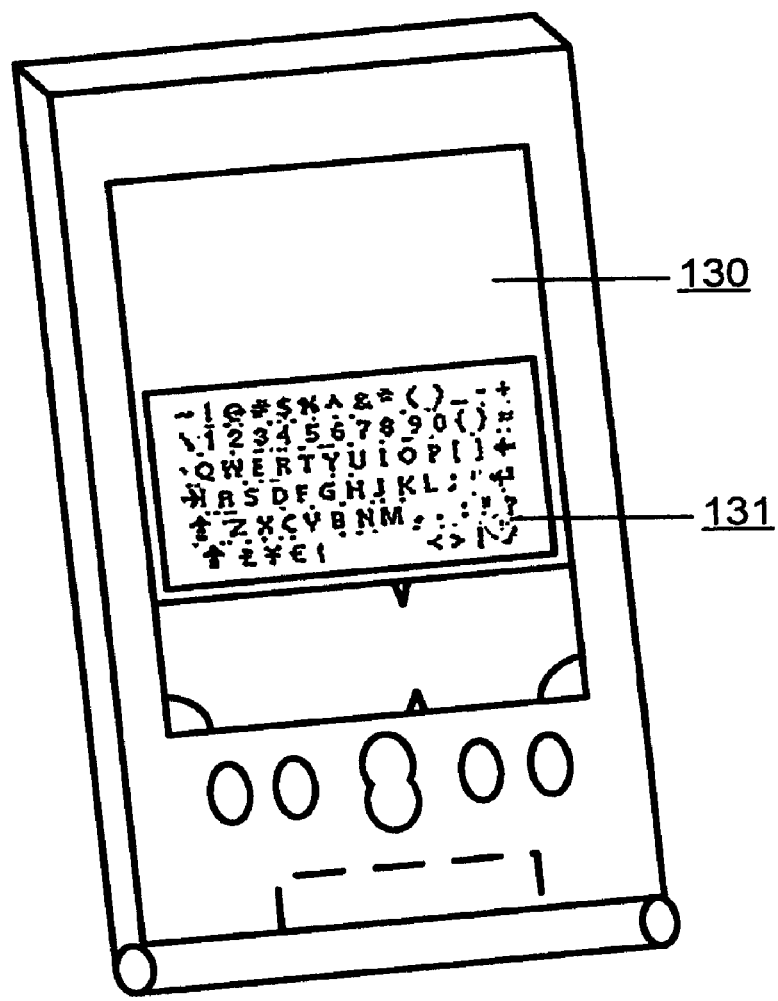
FIG. 1 is a prior art system that illustrates the use of a QWERTY keyboard template on an electronic device.
Figure 2:
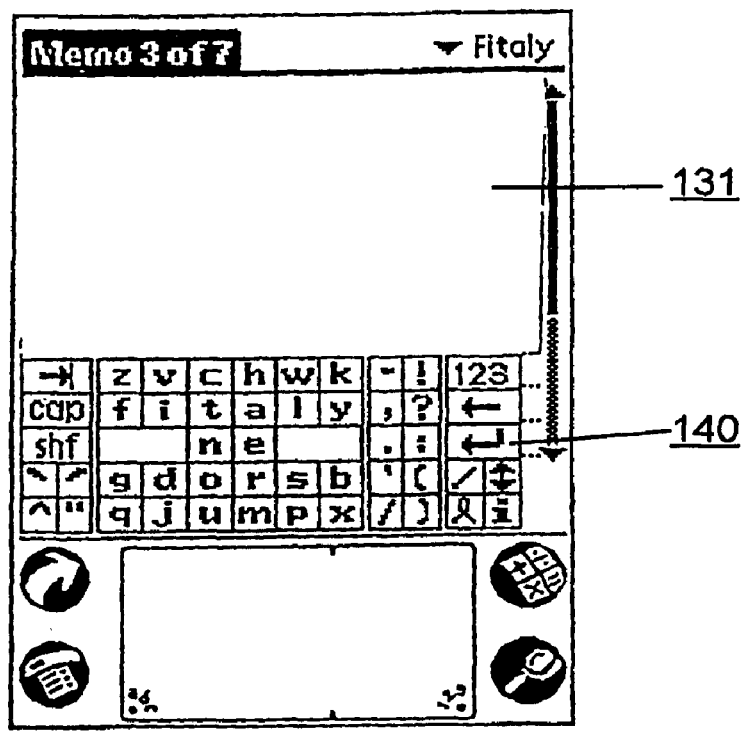
FIG. 2 is a prior art system that illustrates the use of a FITALY keyboard template on an electronic device.
Figure 3:
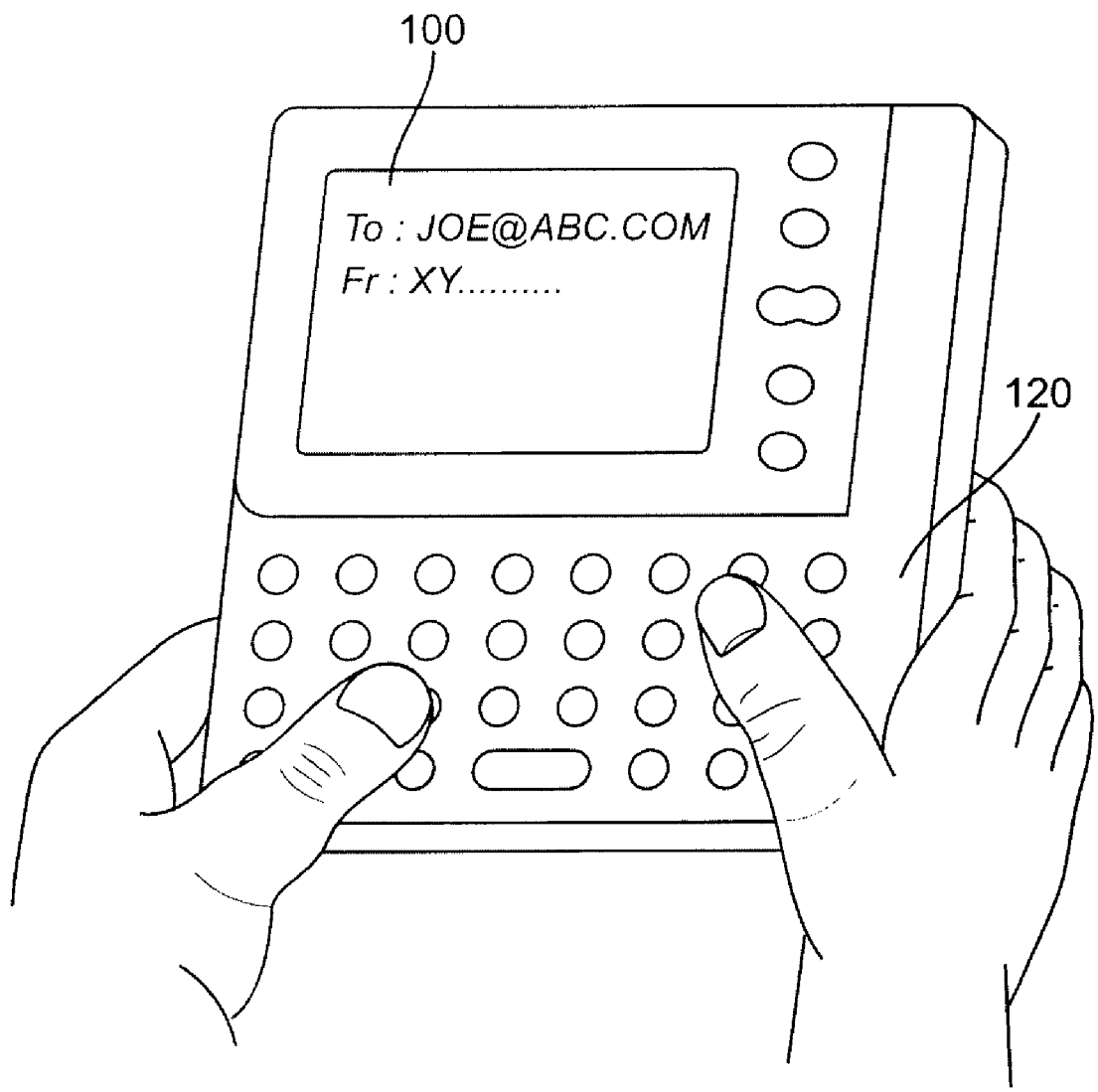
FIG. 3 is a prior art system that illustrates the use of a miniature thumb-activated keyboard with an electronic device.
Figure 4:
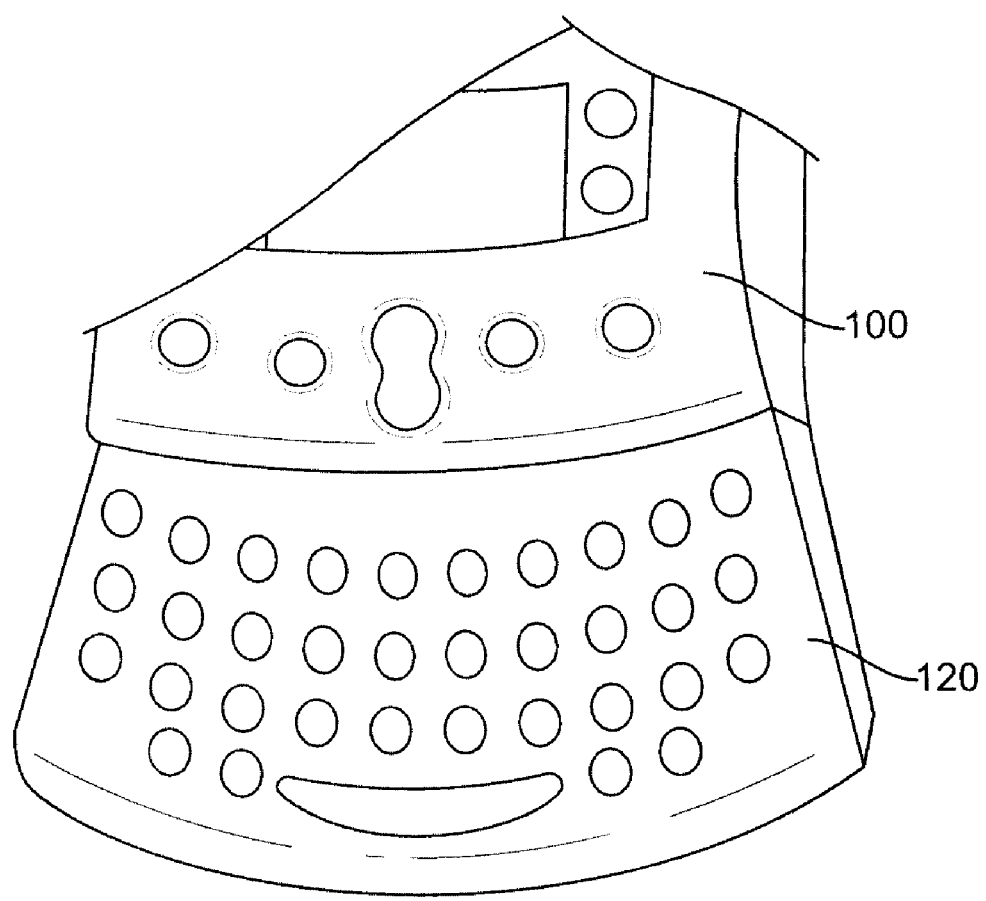
FIG. 4 is a prior art system that illustrates the use of a miniature keyboard with curved rows in conjunction with a personal digital assistant.

FIG. 1 illustrates a network environment 151, including a handheld electronic system (e.g., personal digital assistant 100) coupled to a host computer system and the Internet via a cradle device 160, in which embodiments of the present invention can be practiced.

Network environment 151 comprises a host computer system 156 which can either be a desktop computer system as shown, or, alternatively, can be a laptop computer system 158.

Optionally, more than one host computer system 156 can be used within network environment 151. Host computer system 158 and 156 are shown connected to a communication bus 154, which in one embodiment can be a serial communication bus, but could be of any of a number of well known designs (e.g., a parallel bus, Ethernet Local Area Network (LAN), etc.). In an embodiment, bus 154 can provide communication with the Internet 152 using a number of well-known protocols.

Importantly, bus 154 is also coupled to a cradle 160 for receiving and initiating communication with the personal digital assistant 100. Cradle 160 provides an electrical and mechanical communication interface between bus 154 (and any device coupled to bus 154) and the personal digital assistant 100 for two-way communications. The personal digital assistant 100 also contains a wireless inferred communication mechanism 164 for sending information to other devices And for receiving information from other devices.

FIG. 6 is a block diagram of exemplary circuitry of a portable computing system 100 in accordance with one embodiment of the present invention. The computer system 100 includes a central processor for processing information and instructions. It is appreciated that central processor unit 101 may be a microprocessor or any other type of processor. The computer system 100 also includes data storage features such as a volatile memory 102 (e.g., random access memory, static RAM, dynamic RAM, etc.) for storing information and instructions for the central processor 101 and a non-volatile memory 103 (e.g., read only memory, programmable ROM, flash memory, EPROM, EEPROM, etc.) for storing static information and instructions for the processor 101. Computer system 100 may also include an optional data storage device 104 (e.g., thin profile removable memory) for storing information and instructions. It should be understood that data storage device 104 may be removable. Furthermore, device 104 may also be a secure digital (SD) card reader or equivalent removable memory reader.

Also included in computer system 100 of FIG. 6 is an alphanumeric input device 106 which in one implementation is miniature keyboard as described herein and may include integrated push buttons in one embodiment.

System 100 of FIG. 6 also includes an optional cursor control or directing device 107 for communicating user input information and command selections to the central processor 101. In one implementation, device 107 is a touch screen device (also a digitizer) incorporated with screen 105. Device 107 is capable of registering a position on the screen 105.

Computer system 100 also contains a flat panel display device 105 for displaying information to the computer user. The display device 105 utilized with the computer system 100 may be a liquid crystal device (LCD), cathode ray tube (CRT), field emission device (FED, also called flat panel CRT), plasma or other display technology suitable for creating graphic images and alphanumeric characters recognizable to the user. In one embodiment, the display 105 is a flat panel multi-mode display capable of both monochrome and color display modes.

Also included in computer system 100 of FIG. 6 is a signal communication device 108 that may be a serial port (or USB port) for enabling system 100 to communicate PC 156. In one embodiment, the communication interface is a serial communication port, but could also alternatively be of any of a number of well known communication standards and protocols, e.g., parallel, SCSI, Ethernet, Firewire (IEEE 1394), USB, etc. including wireless communication.

Figure 7:
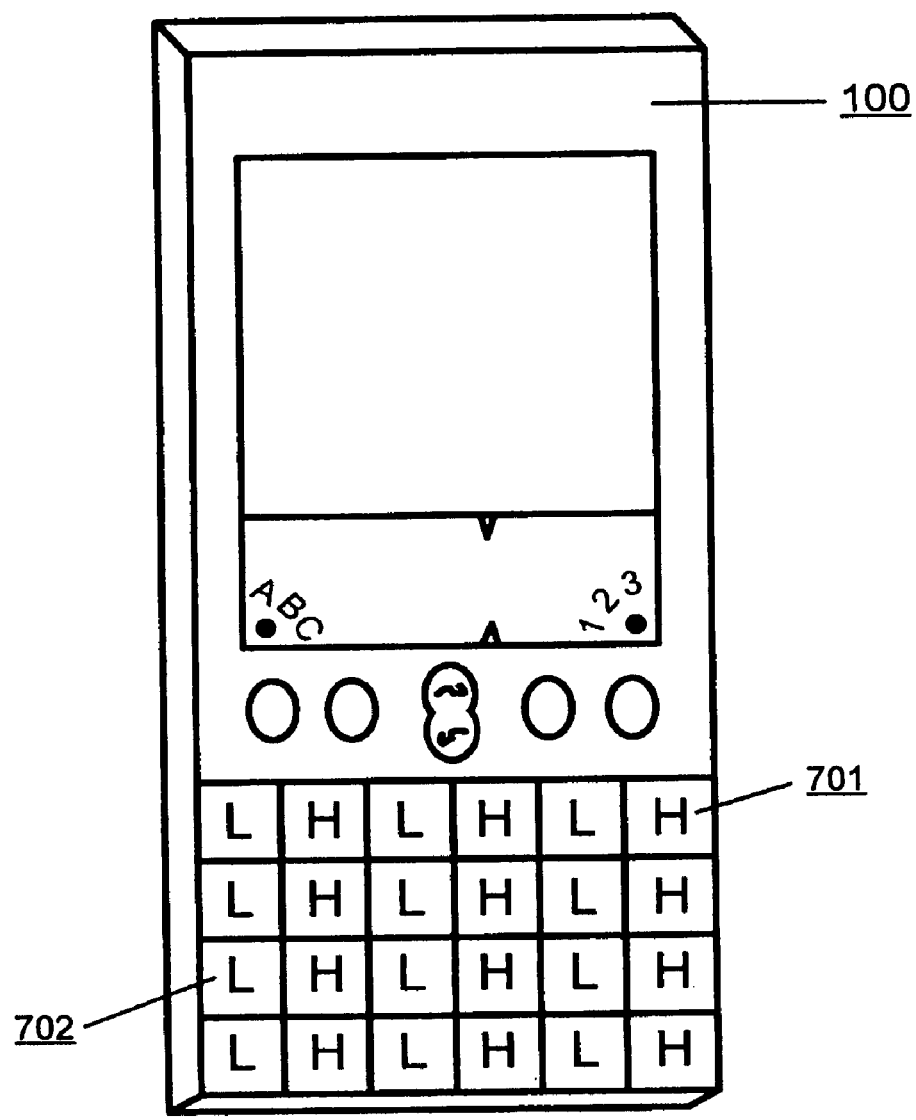
FIG. 7 illustrates a keyboard having alternating columns of raised keys in accordance with an embodiment of the present invention.

A miniature keyboard having keys such that multiple ones could be pressed with a fingertip is described herein. FIG. 7 is an illustration of personal digital assistant 100 that incorporates one embodiment of the present invention. Personal digital assistant 100 comprises a miniature keyboard consisting of raised keys 701 and low keys 702. In this configuration, the keys of different heights are arranged in vertical rows across the miniature keyboard. The raised rows 701 and low rows 702 are alternated across the miniature keyboard. By alternating the height of the rows of keys across the miniature keyboard, data input accuracy and navigation feedback are increased because the difference in key height provides better key differentiation than a standard miniature keyboard. As more tactile feedback provided to the user, the easier the user can depress the correct keys.

Additionally, in this embodiment or any of the following embodiments of the present invention, providing an audible tone when a key is pressed would increase key navigation and differentiation. Optionally, the keys could require different amounts of pressure to depress the keys thus further improving key differentiation and navigation.

Figure 8:
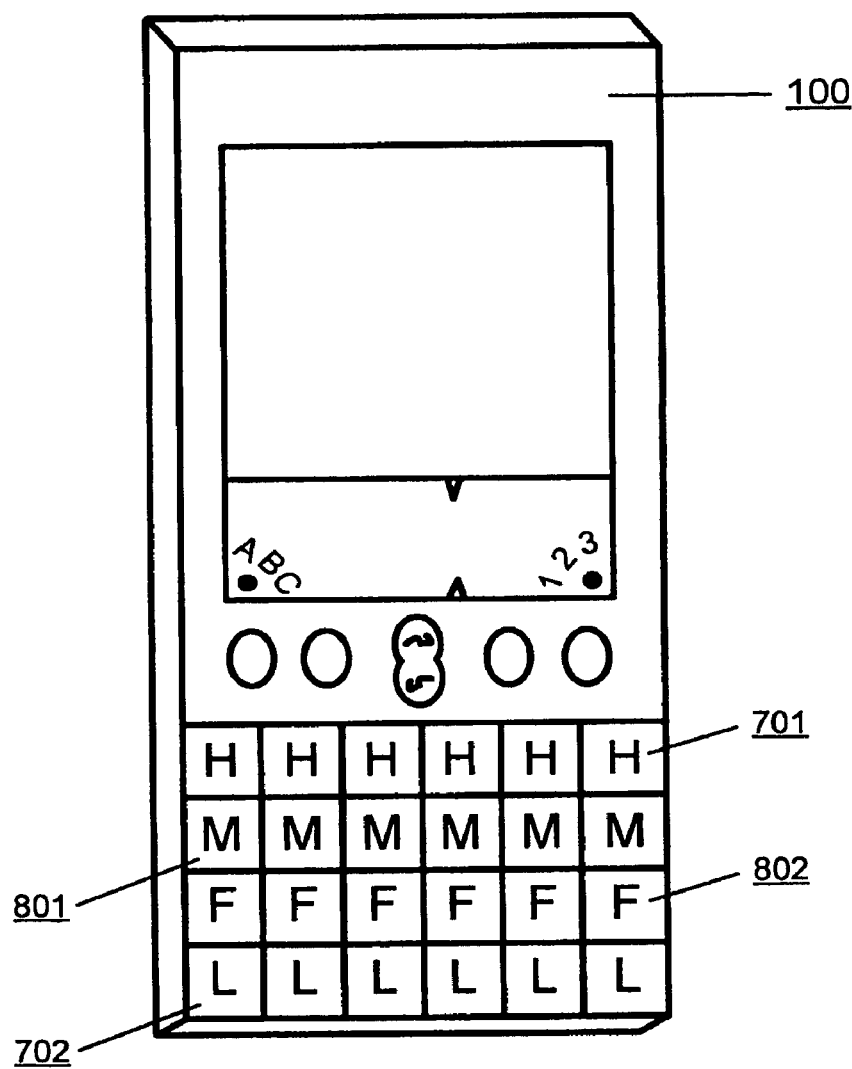
FIG. 8 illustrates a keyboard having rows of keys that decrease in height in accordance with an embodiment of the present invention.

FIG. 8 is an illustration of another embodiment of the present invention. In this embodiment, the miniature keyboard comprises keys that decrease in height from the top of the keyboard to the bottom of the keyboard. In this particular embodiment, the keys are four different heights. On the top of the keyboard are the highest keys ("H") 701. Next is a medium height ("M") of keys 801 that are a little lower than the top row of keys. The third row of keys 802 is slightly lower ("F") than the previous row. Lastly, row 702 is the lowest ("L") of all the rows. By decreasing the height of the rows of keys, key differentiation and data input accuracy is increased.

Figure 9:
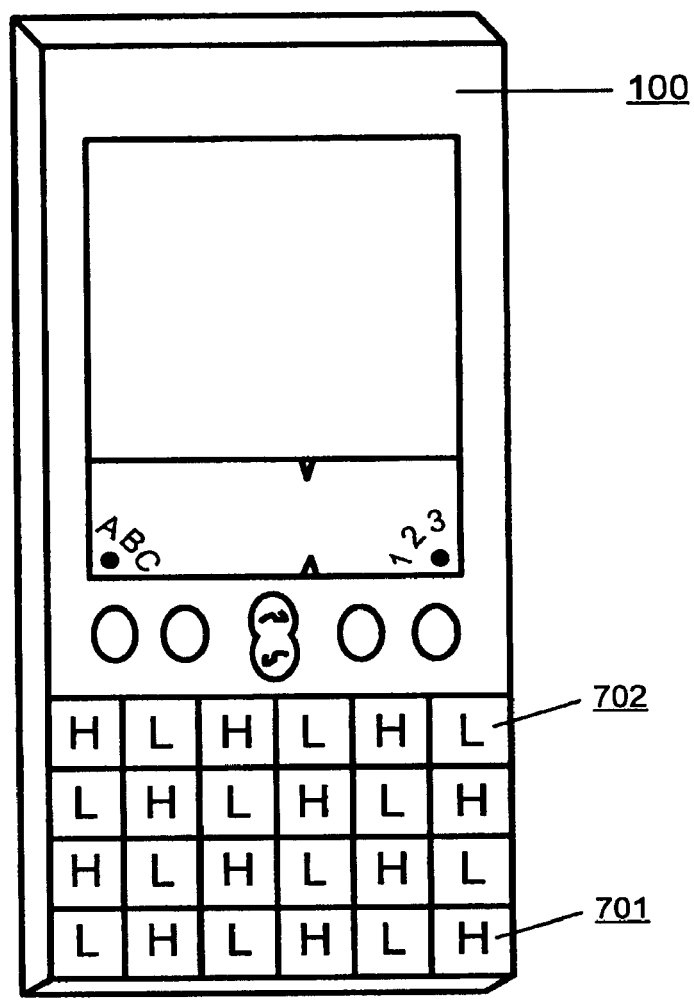
FIG. 9 illustrates a keyboard having raised keys patterned in a checkered pattern in accordance with an embodiment of the present invention.

FIG. 9 is an illustration of another embodiment of the present invention.

In this embodiment, the height of the keys on the keyboard is alternated in a checkered pattern. High keys 701 and low keys 702 are alternated across the rows and down the columns of the keyboard. By arranging the keys in a checkered pattern, it is less likely more than one key will be depressed at once when data is entered. By decreasing the chance of depressing more than one key at a time, the accuracy of data entry is increased and decreasing the chance of depressing more than one key at a time increases key navigation feedback.

Figure 10:
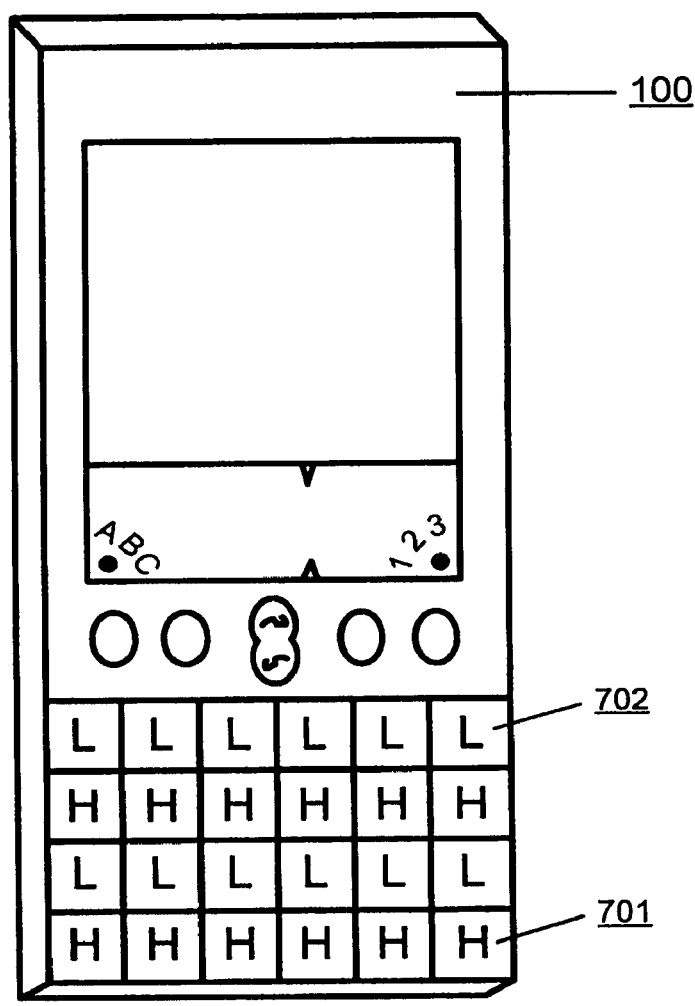
FIG. 10 illustrates a keyboard having alternating rows of raised keys in accordance with an embodiment of the present invention.

FIG. 10 is an illustration of another embodiment of the present invention. In this embodiment, the keys of the keyboard are alternated down the rows of keys. Each row has the same key height across the row, but the rows alternate between high row 701 and low row 702. By alternating the height of alternating rows of keys, key differentiation is increased because it is less likely the fingertip will depress multiple keys.

Figure 11:
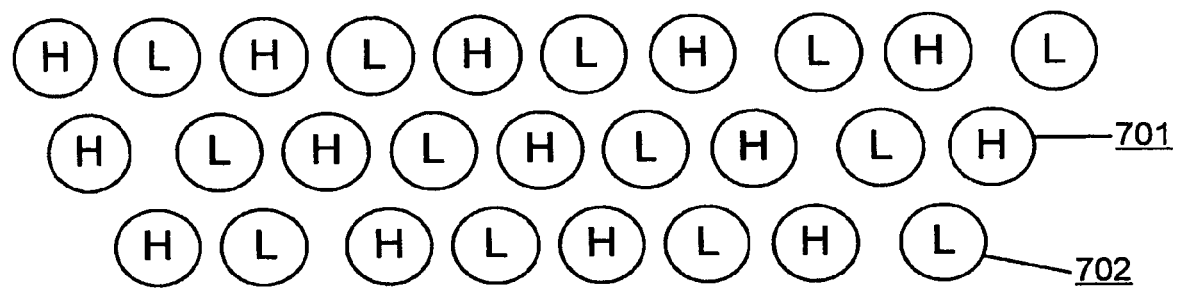
FIG. 11 illustrates a keyboard having raised and staggered keys patterned in a checkered pattern in accordance with an embodiment of the present invention.

FIG. 11 is another embodiment 1100 of the miniature keyboard of the present invention. In this embodiment, the keys are staggered with the key height alternated across diagonal columns. High keys 701 and low keys 702 are alternated across each row resulting in diagonal rows of equal height that slope to the left of the keyboard. By staggering the columns of keys and by alternating the height of the columns of keys, improved key differentiation is achieved.

Figure 12:
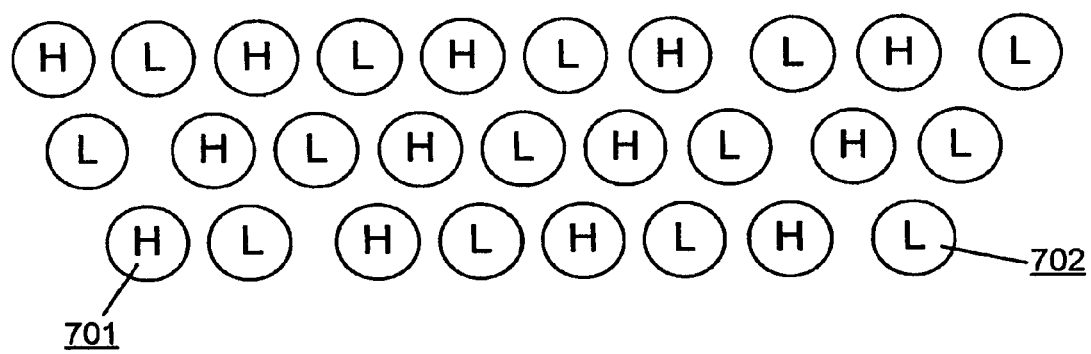
FIG. 12 illustrates a keyboard having staggered keys with raised height that form alternating diagonal columns of keys with similar height in accordance with an embodiment of the present invention.

FIG. 12 is another embodiment 1200 of the miniature keyboard of the present invention. This embodiment is similar to FIG. 11 wherein the keys are staggered with key height alternated across the columns of keys. High keys 701 and low keys 702 are alternated across the rows resulting in diagonal columns of keys sloping to the left that are the same height. Similar to FIG. 11, by staggering the keys and by alternating the height of the diagonal columns of keys, key differentiation the accuracy of data input are greatly improved.

Figure 13:
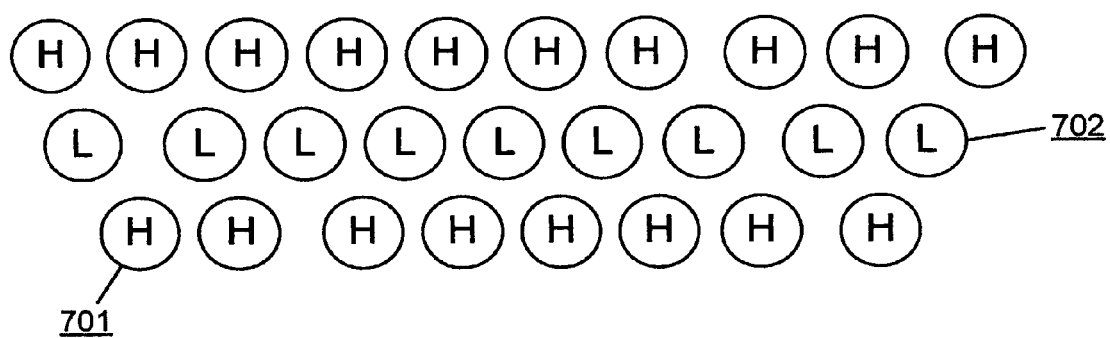
FIG. 13 illustrates a keyboard having alternating rows of raised and staggered keys in accordance with an embodiment of the present invention.

FIG. 13 is another embodiment 1300 of the miniature keyboard of the present invention. In this embodiment, the keys are staggered and the height of keys is alternated down the rows of keys with the middle row being differentiated in height from the other rows. The rows of keys are alternated between high keys 701 and low keys 702. The combination of staggering the keys and alternating the height of the rows of keys creates a keyboard with improved key differentiation and data input. Embodiment 1300 could also have the heights reversed wherein the middle row was raised and the other rows were lowered relatively.

Figure 14:
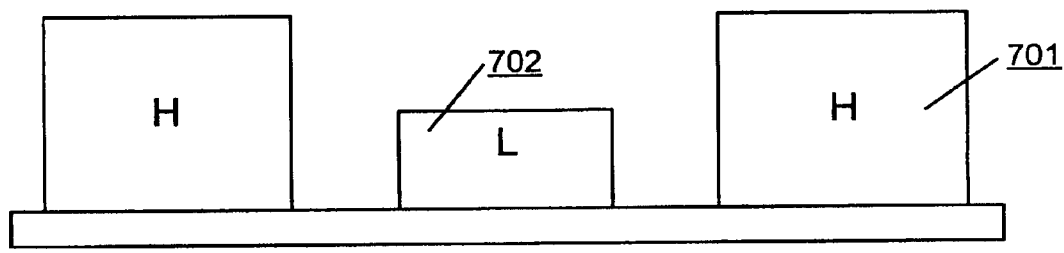
FIG. 14 illustrates differences in height of keys on a keyboard having alternating rows of raised keys in accordance with an embodiment of the present invention.

FIG. 14 illustrates characteristics 1400 of one embodiment of the present invention. This illustration shows a side view of a keyboard with alternating rows of keys. In this illustration, low keys 702 are in the middle of two rows of high keys 701. In this illustration, low keys 702 are about half the height of high keys 701.

Figure 15:
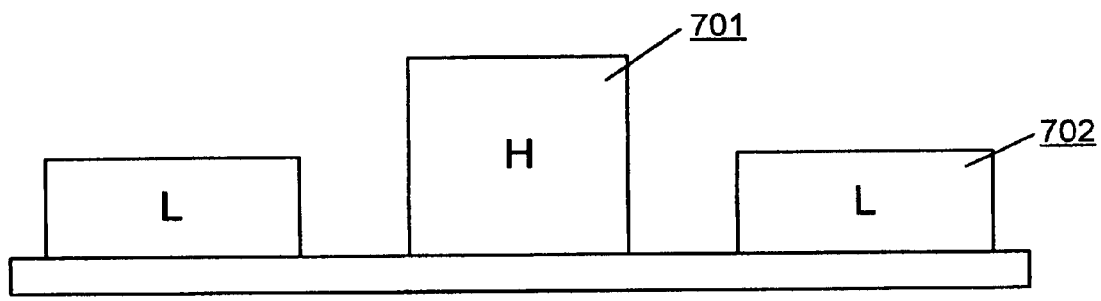
FIG. 15 illustrates differences in height of a keyboard having the middle row of keys raised in accordance with an embodiment of the present invention.

FIG. 15 also illustrates characteristics 1500 of one embodiment of the present invention. This illustration is a side view of a keyboard wherein the middle row of keys is raised above the other rows of keys. High row 701 is about two times the height of low rows 702.

Figure 16:
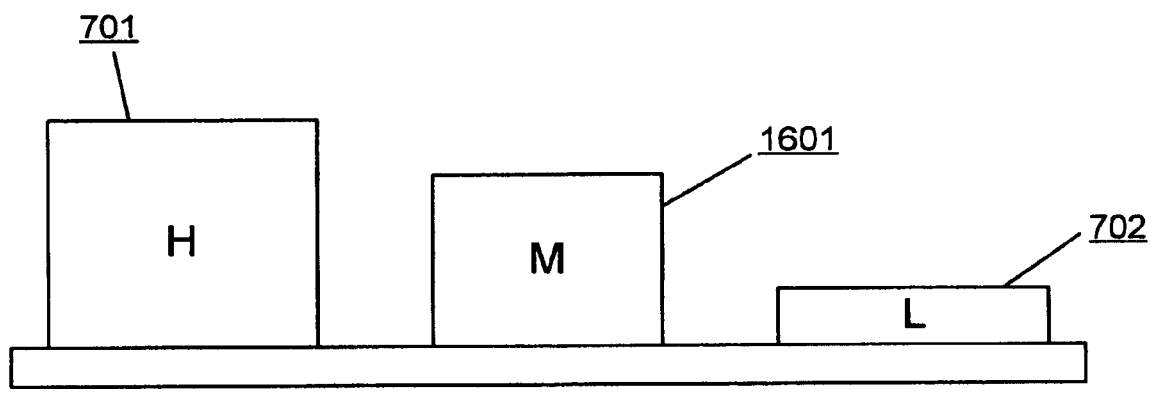
FIG. 16 illustrates characteristics of a keyboard having rows of keys decrease in height in accordance with an embodiment of the present invention.

FIG. 16 illustrates characteristics 1600 of one embodiment of the present invention. This illustration is a side view of a keyboard wherein the rows of keys decrease in height down the keyboard. In this illustration, there are high keys 701 then middle height keys 1601 and lastly the low keys 702.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A miniature keyboard comprising:
   a plurality of keys for inputting data to a portable electronic device;
   wherein said keys of said plurality of keys are individually sized such that multiple keys can be depressed by a single finger tip depression;
   wherein said keys comprise at least one set of keys that are raised for providing key differentiation and to facilitate single key selection; and
   wherein said raised set of keys comprise a substantially checkered pattern on said miniature keyboard.

2. A miniature keyboard as recited in claim 1 wherein said set of keys is of different shapes.

3. A miniature keyboard as recited in claim 1 wherein said plurality of keys is arranged in substantially a QWERTY keyboard fashion.

4. A miniature keyboard as recited in claim 1 wherein said portable electronic device is a personal digital assistant.

5. A keyboard arrangement as recited in claim 1 wherein said plurality of keys makes a tone when pressed.

6. A keyboard arrangement as recited in claim 1 wherein said plurality of keys requires different amount of pressures to depress.

7. A portable computer system comprising:
   a processor coupled to a bus;
   a memory coupled to said bus;
   a miniature keyboard coupled to said bus and comprising:
      a plurality of keys for inputting data;
      wherein said keys are individually sized such that multiple keys can be depressed by a single fingertip depression;
      wherein said keys of said plurality of keys comprise at least one set of keys that are raised for providing key differentiation and to facilitate single key selection; and
      wherein said raised set of keys comprise a substantially checkered pattern on said miniature keyboard.

* * * * *